US012405900B2

(12) United States Patent
Neuman et al.

(10) Patent No.: US 12,405,900 B2
(45) Date of Patent: Sep. 2, 2025

(54) PREFETCH MEMORY MANAGEMENT UNIT FOR REAL-TIME VIRTUAL MEMORY ADDRESS TRANSLATION

(71) Applicant: Avago Technologies International Sales Pte. Limited, Singapore (SG)

(72) Inventors: Darren Neuman, Palo Alto, CA (US); Flaviu Dorin Turean, Palo Alto, CA (US); Friederich Mombers, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/498,449

(22) Filed: Oct. 31, 2023

(65) Prior Publication Data

US 2025/0139017 A1    May 1, 2025

(51) Int. Cl.
*G06F 12/1009*    (2016.01)
*G06F 12/1045*    (2016.01)
*G06F 13/16*    (2006.01)

(52) U.S. Cl.
CPC ...... *G06F 12/1045* (2013.01); *G06F 12/1009* (2013.01); *G06F 13/1673* (2013.01)

(58) Field of Classification Search
CPC ............. G06F 12/1045; G06F 12/1009; G06F 13/1673; G06F 2212/681
See application file for complete search history.

(56) References Cited

U.S. PATENT DOCUMENTS

| 2016/0170904 | A1* | 6/2016 | Guo ..................... G06F 12/1045 711/207 |
| 2020/0183858 | A1* | 6/2020 | Campbell ........... G06F 12/1036 |
| 2021/0149818 | A1 | 5/2021 | Venkataraman et al. |
| 2022/0100653 | A1 | 3/2022 | Loh |
| 2022/0309001 | A1* | 9/2022 | Campbell ........... G06F 12/0862 |

FOREIGN PATENT DOCUMENTS

CN    114925001 A    8/2022

OTHER PUBLICATIONS

Extended European Search Report, European Application No. 24200152.7 dated Mar. 13, 2025, 10 pages.
Konstantinos Kanellopoulos et al., "Utopia: Efficient Address Translation using Hybrid Virtual-to-Physical Address Mapping", arXiv.org, Cornell University Library, 201 Olin Library Cornell University Ithaca, NY 14853, May 24, 2023, XP091516504, 14 pages.

* cited by examiner

*Primary Examiner* — Kalpit Parikh
(74) *Attorney, Agent, or Firm* — King Intellectual Asset Management

(57) ABSTRACT

An MMU with prefetch functionality is provided. The MMU includes a first TLB, burst buffer, second TLB and control logic. The first TLB is configured to fetch a first set of one or more first page table entries based, at least in part, on a virtual address, and before a request to access a client address is received from a client. The burst buffer stores a plurality of second page table entries from a respective page table associated with a first page table address. A second translation lookaside buffer is configured to fetch a first set of one or more second page table entries of the plurality of second page table entries from the burst buffer based, at least in part, on the virtual address, and before the request to access a client address is received from the client.

20 Claims, 4 Drawing Sheets

PREFETCH MEMORY MANAGEMENT UNIT FOR REAL-TIME VIRTUAL MEMORY ADDRESS TRANSLATION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for real-time virtual memory address translation in memory management units.

BACKGROUND

Conventionally, real-time hardware access of dynamic random-access memory (DRAM) is controlled by a strict schedule. Meanwhile, virtual memory management is useful for application processors and Linux. Using virtual memory for hardware involves additional memory access steps to read virtual memory page tables, followed by memory access for video clients. Combining the use of virtual memory with the rigid deadlines for fetching data stored in memory often results in real-time applications (such as video processing) missing hard real-time deadlines.

Thus, a memory management unit (MMU) with prefetch functionality for real-time virtual address translation is provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF EMBODIMENTS

Figure 1:
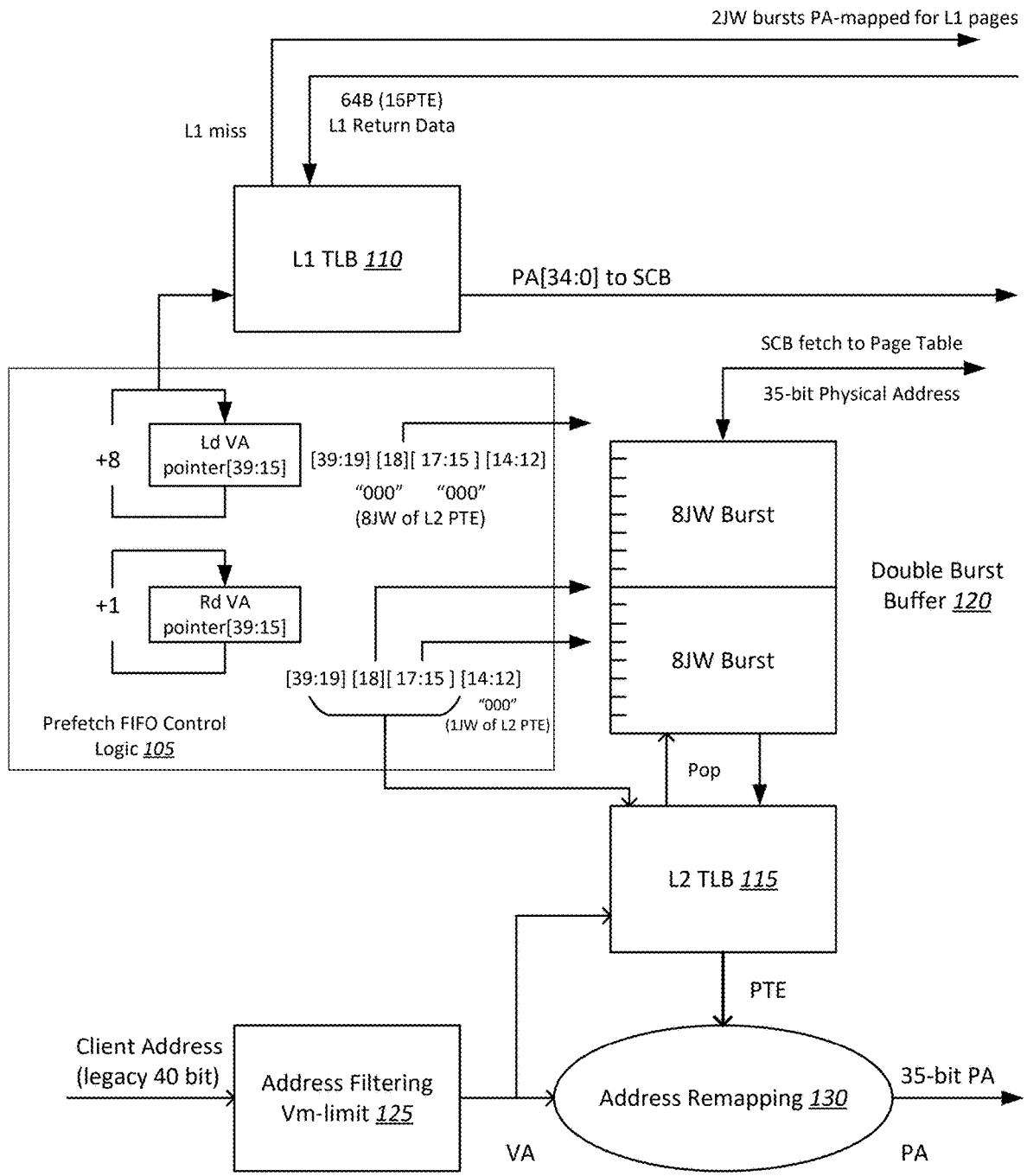
FIG. 1 is a schematic block diagram of an architecture for a virtual memory prefetch MMU, in accordance with various embodiments.

Various embodiments set forth a framework and implementation for real-time virtual memory address translation utilizing a prefetch MMU.

In some embodiments, an apparatus for a prefetch MMU is provided. The apparatus includes system memory, and a memory management unit coupled to the system memory. The memory management unit includes a first translation lookaside buffer, burst buffer, second translation lookaside buffer and control logic. The first translation lookaside buffer is configured to fetch a first set of one or more first page table entries before a request to access data at a client address is received from a client, wherein the client address is an address in virtual memory space used by the client, and wherein the first set of one or more first page table entries is fetched based, at least in part, on a virtual address. The burst buffer stores a plurality of second page table entries from a respective page table associated with a first page table address. A second translation lookaside buffer is configured to fetch a first set of one or more second page table entries of the plurality of second page table entries from the burst buffer based, at least in part, on the virtual address, and before the request to access data at the client address is received from the client. The control logic is configured to transmit the virtual address to the first and second translation lookaside buffers, and cause the burst buffer to store the plurality of second page table entries.

In further embodiments, a prefetch MMU is provided. The prefetch MMU includes a first translation lookaside buffer, burst buffer, second translation lookaside buffer and control logic. The first translation lookaside buffer is configured to prefetch a first set of one or more first page table entries based, at least in part, on a virtual address, and wherein the prefetch of the first set of one or more first page table entries occurs before a request to access data at a client address is received from a client, wherein the client address is an address in virtual memory space used by the client. The burst buffer stores a plurality of second page table entries from a respective page table associated with a first page table address. A second translation lookaside buffer is configured to prefetch a first set of one or more second page table entries of the plurality of second page table entries from the burst buffer based, at least in part, on the virtual address, wherein the prefetch of the first set of one or more second page table entries occurs before a request to access data at a client address is received from the client. The control logic is configured to transmit the virtual address to the first and second translation lookaside buffers, and cause the burst buffer to store the plurality of second page table entries.

In further embodiments, a system for a prefetch MMU is provided. The system includes system memory, a processor coupled to the system memory, and a non-transitory computer readable storage having encoded thereon a set of instructions executable by the processor to perform various functions. In some examples, the set of instructions may be executed by the processor to transmit a virtual address to a first translation lookaside buffer and to a second translation lookaside buffer, and fetch a first set of one or more first page table entries before a request to access data at a client address is received from a client, wherein the client address is an address in virtual memory space used by the client, and wherein the first set of one or more first page table entries is fetched based, at least in part, on the virtual address, wherein each first page table entry of the one or more first page table entries is associated with a respective page table address. The instructions may further be executed by the processor to store the first set of one or more first page table entries in the first translation lookaside buffer, and storing, via a burst buffer, a plurality of second page table entries based, at least in part, on the virtual address. The instructions may further be executed by the processor to fetch a first set of one or more second page table entries of the plurality of second page table entries from the burst buffer based, at least in part, on the virtual address, and before the request to access data at the client address is received from the client, and store the first set of one or more second page table entries in the second translation lookaside buffer.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

When an element is referred to herein as being "connected" or "coupled" to another element (which includes mechanically, electrically, or communicatively connecting or coupling), it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Likewise, when an element is referred to herein as being a "layer," it is to be understood that the layer can be a single layer or include multiple layers. For example, a conductive layer may comprise multiple different conductive materials or multiple layers of different conductive materials, and a dielectric layer may comprise multiple dielectric materials or multiple layers of dielectric materials. When a layer is described as being coupled or connected to another layer, it is to be understood that the coupled or connected layers may include intervening elements present between the coupled or connected layers. In contrast, when a layer is referred to as being "directly" connected or coupled to another layer, it should be understood that no intervening elements are present between the layers. However, the existence of directly coupled or connected layers does not exclude other connections in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

The terms "machine readable medium" and "computer readable medium," as used herein, refer to any medium that participates in providing data that causes a machine to operate in a specific fashion. In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, read-only memory, solid state memory, optical and/or magnetic disks, among other non-volatile storage devices. Volatile media includes, without limitation, dynamic memory, such as DRAM.

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Typically, when a client attempts to access a DRAM address, multiple fetches are performed. First, the page table entry (PTE) for a specific virtual address is fetched, from which a translation (e.g., remapping) to a physical address is performed. Once the physical address is obtained, a second DRAM access is made to the physical address. For real-time hardware processing, this can result in missed real-time deadlines.

In one conventional approach, to avoid missing real-time deadlines, hardware clients in physically mapped DRAM could be utilized, which would not interact directly with applications running in virtual memory. In other approaches, the CPU may copy data from the user space to the driver space into a physical memory block of DRAM at a high cost to performance. In another alternative approach, contiguous physical memory may be allocated for use by both applications and hardware. However, such systems would often run out of memory or suffer from memory fragmentation when multiple hardware cores use large blocks of contiguous memory.

The proposed prefetch MMU framework sets forth an architecture and framework for a virtual address prefetching MMU. Specifically, an MMU is set forth in which virtual memory page table information is read by the MMU ahead of real-time hardware, such as video client hardware and/or other real-time hardware processing, such as real-time processing of audio data, satellite bitstreams, and/or cable bitstreams. As used herein, hard real-time hardware refers to hardware systems subject to real-time timing constraints, such as response times and other real-time deadlines. As used herein, "hard real-time" refers to systems (e.g., hardware and/or software) subject to a set of one or more strict deadlines, where missing a deadline is considered a system failure. Thus, in order to meet hard real-time deadlines (or deadlines in other "soft" real-time systems), the MMU may predictively prefetch a virtual memory PTE such that the real-time hardware can meet its deadline while also reading from a virtual memory space utilized by applications and operating systems, such as Linux. Fetching, as used herein, refers to the process of retrieving data from a source, in this case system memory such as DRAM. Prefetching, thus, refers to the process of fetching data from system memory for use by a client before a request for the data is made by the client. An MMU refers to a processor and corresponding logic that provides memory management functionality as described herein. In some examples, the MMU may manage all memory references, manage virtual memory address space, and provides translation between virtual memory addresses and physical memory addresses as described below. System memory may refer to physical and/or virtual memory used by a computer system. System memory includes, without limitation, random access memory (RAM) (e.g., DRAM, static random access memory (SRAM)), read-only memory (ROM), storage devices such as a hard drive or removable media, etc. System memory, as used in the context of some of the examples below, may contrast with on-chip memory (e.g., on-chip cache memory, such as L1 or L2 cache) as expressly described and/or dictated by context.

FIG. 1 is a schematic block diagram of an architecture for a virtual memory prefetch MMU 100, in accordance with various embodiments. The prefetch MMU 100 includes prefetch first-in first-out (FIFO) control logic 105, a level 1 (L1) translation lookaside buffer (TLB) 110, a level 2 (L2) TLB 115, a double burst buffer 120, address filtering logic 125, and address remapping logic 130. It should be noted that the various parts and components of the MMU 100 are schematically illustrated in FIG. 1, and that modifications to the various components and other arrangements of the MMU 100 may be possible and in accordance with the various embodiments.

In various embodiments, the prefetch FIFO control logic 105 is coupled to the L1 TLB 110, L2 TLB 115, and double burst buffer 120. The prefetch FIFO control logic 105 may include two virtual address (VA) pointers, Ld VA and Rd VA. As will be described in greater detail below, the Ld VA pointer may be used by the prefetch FIFO control logic 105 to manage loading of the double burst buffer 120 and/or L1 TLB 110 from system memory, such as DRAM. The Rd VA pointer may be used by the prefetch FIFO control logic 105 to read PTEs from the double burst buffer 120 into the L2 TLB 115. Thus, in various examples, the prefetch FIFO control logic 105 is configured to prefetch one or more VA PTEs to be loaded into the double burst buffer 120, loaded into L1 TLB 110, and/or loaded into L2 TLB 115. Logic, as used herein, may refer to logic that is implemented in hardware (e.g., a logic circuit), software, and/or hardware and software. Accordingly, in various embodiments, the prefetch FIFO control logic 105 may be implemented in hardware and/or software. In various embodiments, a page table entry may refer to an entry in a page table, which provides translations between a VA and a PA. More specifically, a page table entry may contain information about a specific page of physical memory, including a physical base address for the associated page of physical memory.

In various embodiments, logic in the MMU 100 (such as prefetch FIFO control logic 105, and logic in the L1 TLB 110 and/or L2 TLB 115) may include firmware, drivers, libraries, and/or other code, such as one or more computer programs provided by various embodiments, and/or may be designed to implement methods described herein. Merely by way of example, one or more processes described herein may be implemented as code and/or instructions executable by a computer (and/or a processor within a computer, such as the MMU 100).

A set of these instructions and/or code might be encoded and/or stored on a non-transitory computer readable storage medium, such as on-chip memory. In other embodiments, the storage medium might be separate from a computer system (i.e., a removable medium, such as a compact disc, etc.), and/or provided in an installation package, such that the storage medium can be used to program, configure, and/or adapt a computer or processor with the instructions/code stored thereon. These instructions might take the form of executable code, which is executable by a computer system and/or processor of the computer system, which, upon compilation and/or installation on the computer system (e.g., using any of a variety of generally available compilers, installation programs, compression/decompression utilities, etc.) then takes the form of executable code.

Substantial variations may be made in accordance with specific requirements. For example, customized hardware, such as programmable logic, single board computers, field programmable gate arrays (FPGA), application specific integrated circuits (ASIC), system on a chip (SoC), or other custom integrated circuits (IC), might also be used, and/or particular elements might be implemented in hardware, software, or both.

For purposes of explanation, it is assumed that data access is linear, utilizing a single pointer. The MMU 100 utilized a single L2 PTE once, accesses the corresponding page, and moves to the next page. It is assumed there is no backtracking to a previous page, and access is linear in VA address order. Moreover, in various embodiments, each system command bus (SCB) client is described in the context of having a respective MMU 100 instance. It is to be understood that in other embodiments, multiple SCB clients may be present concurrently in a particular environment, and that each SCB client is partitioned from each other, each SCB client having a respective MMU instance. As used herein, an SCB client refers to an entity, such as an application, hardware core, and/or the OS that makes a memory access request. An SCB, as used herein, refers to a bus between clients and the MMU 100, which clients may utilize to access the DRAM (e.g., send access requests to the MMU 100, etc.).

To accommodate hard real-time deadlines, the MMU 100 utilizes TLBs coupled to prefetch FIFO control logic 105, in this example, L1 and L2 TLBs 110, 115. The L1 and L2 TLBs 110, 115 may be coupled to the Prefetch FIFO control logic 105, and the L2 TLB 115 further coupled to the double burst buffer 120. In various examples, a TLB may be a memory cache (e.g., an associative cache) that stores translations of VAs to physical addresses (PA), called PTEs. PTEs, thus, contain the mappings of VAs to PAs.

In various embodiments, a client address may be received by the MMU, which is then filtered via address filtering logic 125. As used herein, a client address is a virtual address used by a client, such as an application, the OS, and/or a hardware core, to be translated by the MMU 100. In various examples, the address filtering logic 125 may be logic configured to filter the address to limit the virtual memory range based on the virtual memory limit (vm-limit) register database (RDB) register. In various examples, the vm-limit establishes an upper bound of VAs, beyond which are not populated in the L1 TLB.

The L2 TLB 115 may then be used to lookup and obtain a PTE associated with the filtered VA, and address remapping logic 130 may remap the VA to a PA, from which requested data may be fetched. In various examples, address remapping logic 130 may include logic configured to remap the VA to PA, based on a PTE. For example, in some embodiments, remapping a VA may include converting a large (e.g., 40-bit) VA into a PA that that is utilized for addressing DRAM (e.g., a 35-bit PA).

In some examples, the L2 TLB 115 may generate a physical page address. The VA may then be concatenated to VA bits [11:0] within page, in which the bottom 12-bits of the VA are retained. The upper 28 bits are used to lookup a translation in the Page Table, and the output of the Page Table (e.g., a PTE) provides an address where the associated page is located in physical DRAM. In this manner, the address remapping logic 130 may map 40-bits to 35-bits.

In various embodiments, the double burst buffer 120 may be a buffer sized to hold two sets of 8 "jword" (JW) bursts from a page table (e.g., as stored in DRAM). For example, in various embodiments, a PTE may be 32-bits. 1JW may contain 8 PTEs, and therefore 1JW may be 256 bits in length. Correspondingly, an 8JW burst may hold 8 PTEs. In various examples, the double burst buffer 120 may be addressed with VA counters, incrementing by 1JW for Read, and 8JW for Write. In the example depicted, an 8JW burst is utilized, but in other examples, for slower data traffic, a 4JW or 2JW burst may be used. In various embodiments, the double burst buffer 120 is a FIFO buffer (referred to interchangeably as a "FIFO" or "prefetch FIFO"). Accordingly, a burst buffer, as used herein, is a type of buffer that is used to store a "burst" of data fetched from system memory (e.g., DRAM). Thus, a burst buffer may refer to a rapidly accessible buffer to which data transferred in "burst mode" may be written and/or later read.

Accordingly, in various embodiments, prefetching of L1 and L2 PTEs may occur before a request to access data at a client address is received by the MMU 100. As will be described in greater detail below, the L1 TLB 110 and L2 TLB 115 may fetch PTEs associated with an initial VA that is selected from a virtual memory address space associated with a given client (e.g., a VA is within the range of VAs utilized by the client/client addresses).

In various examples, to prefetch PTEs, the prefetch is a simple address generator which matches the access order of the client (e.g., a SCB client, such as a video feeder device (VFD)), and generates DRAM reads to the page table, and stores the resulting 8JW burst in the double burst buffer 120. Each fetch from the Page Table at a VA may return 8JW (e.g., 256 Bytes), or 64 PTEs. The TLB may operate off each address burst created by the client (e.g., an SCB client), and may use the VA to compare to the entries in the TLB (e.g., the L2 TLB 115 and/or L1 TLB 110), and upon a match, will use the resulting PTEs to remap the VA to a PA. In some examples, when there is a TLB miss, the next JW may be popped off of the double burst buffer 120, and loaded into the TLB (e.g., L2 TLB 115). Accordingly, in various embodiments, PTEs may be prefetched and stored in the double burst buffer 120, and pushed into a TLB, in this example the L2 TLB 115.

In some examples, for two level page table functionality, each L1 TLB 110 entry may reference 4 MB of PA memory. In this configuration, 4JW worth of L1 entries may hold 32 L1 page pointers (referencing 128 MB of memory), which may further be single buffered. In other examples, the number of lines in the TLB (e.g., L1 TLB 110 and/or L2 TLB 115) may be determined based on addressing patterns. For example, a MPEG feeder (MFD) may utilize more lines in the TLB. For example, for an 8K video frame, the TLB may utilize 48 lines. In some further examples, bursts that cross page boundaries will need to perform two address lookups for each SCB command. Special attention must be paid to the timeline, to ensure that a TLB miss between address cycles on SCB is not disrupted by the need to populate the double burst buffer 120. In some examples, a Rdy-Accept protocol design may be implemented to ensure that the client does not generate any SCB transactions until the MMU 100 has pre-loaded the first burst from DRAM.

Details of the L2 TLB, L1 TLB, and prefetch FIFO control logic 105 will be described in greater detail below with reference to FIGS. 2-4.

Figure 2:
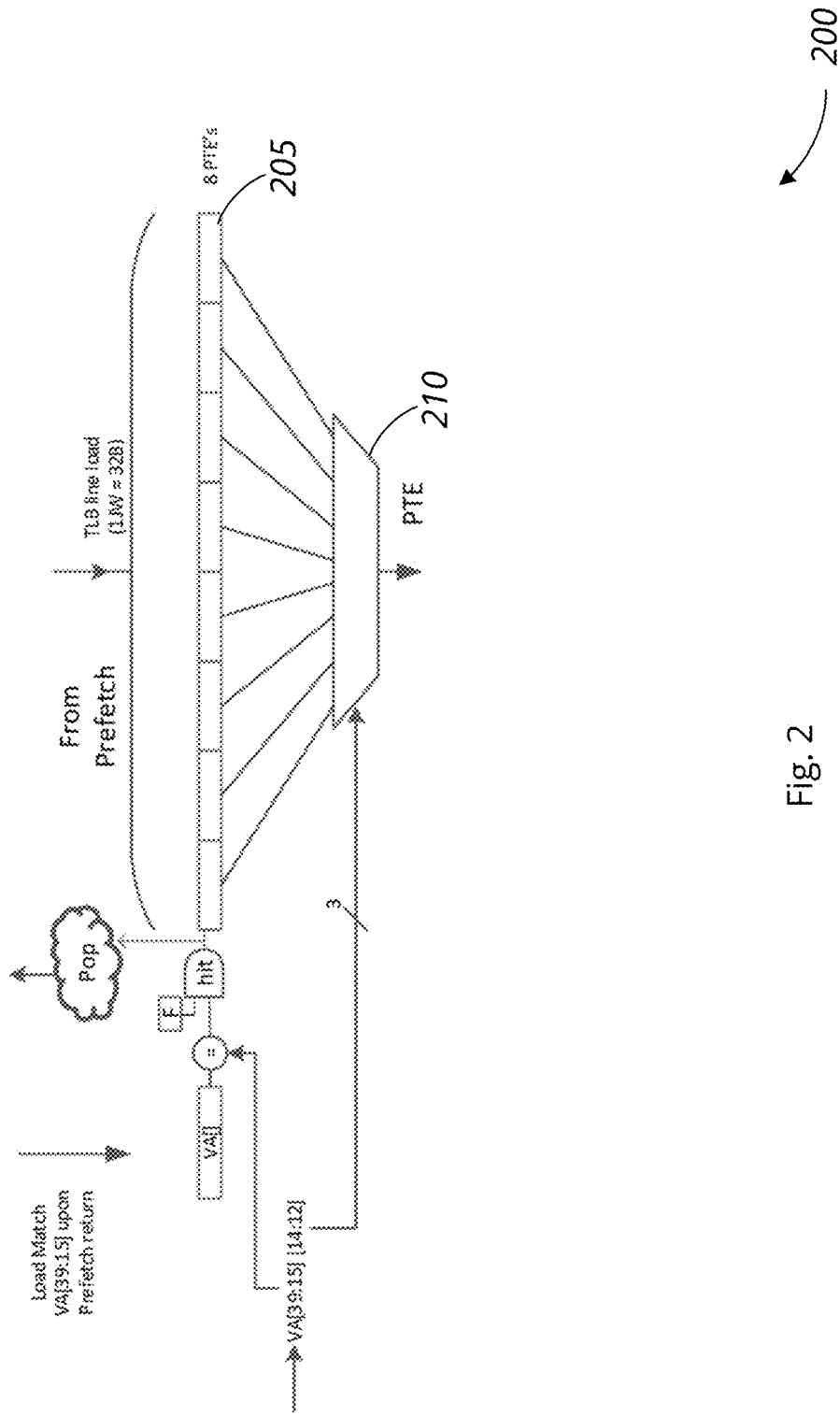
FIG. 2 is a schematic block diagram of a L2 TLB for a prefetch MMU, in accordance with various embodiments.

FIG. 2 is a schematic block diagram of a L2 TLB 200 for a prefetch MMU, in accordance with various embodiments. The L2 TLB 200 includes buffer line 205 and multiplexer 210. It should be noted that the various parts and components of the L2 TLB 200 are schematically illustrated in FIG. 2, and that modifications to the various components and other arrangements of the L2 TLB 200 may be possible and in accordance with the various embodiments.

In the example depicted, the L2 TLB 200 is a 1-line TLB with 1JW of storage. In some examples, because the prefetch FIFO control logic can populate, or "pop," more TLB entries from the double burst buffer, fewer PTEs can be stored in the L2 TLB 200 at a given time. In some examples, a pop signal may occur when either: 1) the line is empty, in which case a prefetch FIFO control logic can pop from the double burst buffer (or other FIFO buffer) at startup; or 2) a MISS condition occurs while the L2 TLB 200 is full.

Accordingly, the buffer line 205 may be filled during startup, and remain filled during operation until a MISS condition occurs. The buffer line 205, in various examples, is a cache line (e.g., a line of cache) of the L2 TLB 200. A cache line may refer to a chunk of memory mapped to a cache (e.g., managed by a cache). In various examples, a MISS condition occurs when an incoming VA from a client is not found (e.g., is not populated) in the buffer line 205. For every MISS, a new line may be loaded into the buffer line 205 from, for example, a double burst buffer as previously described, by the prefetch FIFO control logic. In some examples, because there is only one buffer line 205, the L2 TLB 200 may omit a load counter. In an alternative embodiment, the L2 TLB 200 may be a zero-line TLB (e.g., no buffer lines 205), and instead read data directly from a FIFO buffer.

When new data arrives from a FIFO (e.g., double burst buffer or other FIFO buffer), a "match VA" value may be used to generate a VA tag. The VA tag may be a value that represents an actual prefetched VA. The VA tag may be used for comparison of an incoming client address (e.g., VA received from the client) against the prefetched address stored in the buffer line 205. For example, the upper bits (e.g., VA[39:15]) of a client address may be used to generate the VA tag. The VA tag may be compared to the upper bits of incoming client VA. In the event of a match, (e.g., a hit), three bits of the VA (e.g., VA[14:12]) may be used to select a PTE from the buffer line 205. For example, in various embodiments, the multiplexer 210 may be configured to select one of the 8 PTEs stored in the buffer line 205, based on VA[14:12]. Thus, in some examples, the multiplexer 210 may be an 8:1 multiplexer (e.g., an 8 PTE to 1 PTE multiplexer). The PTE may be utilized to replace the upper bits (e.g., VA[39:15]) with physical address bits. The "F" block may be used to indicate whether the buffer line 205 is full or empty. In the event that the buffer line 205 is empty, the AND logic block ensures that a hit condition is not generated (e.g., F=0 when the line buffer 205 is empty).

In some examples, the VA tag may match sequentially, line to line. Thus, subsequently popped lines may be configured to have sequential VA tags. However, if there is an error, or if the page table becomes corrupted, the client address may generate a large number of MISS conditions, as the VA from the client does not match the VA from the prefetch FIFO. For example, in some embodiments, error conditions may include, without limitation, when a threshold number of MISS conditions occur in a row (for example, 16 misses in a row), the L2 TLB 200 may be configured to stop processing, and indicate an error condition (e.g., generating an error signal).

Figure 3:
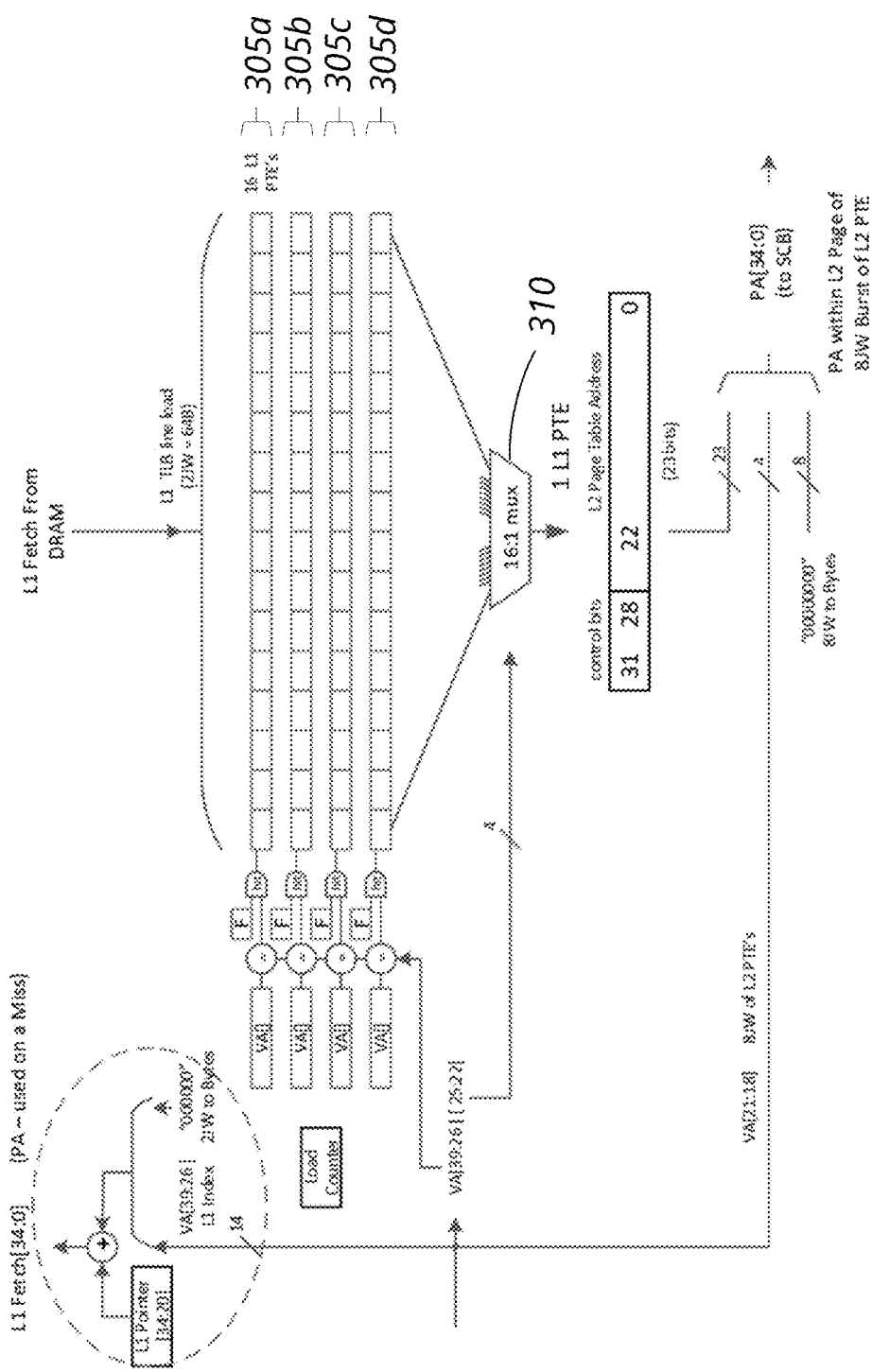
FIG. 3 is a schematic diagram of an L1 TLB for prefetch, in accordance with various embodiments.

FIG. 3 is a schematic diagram of an L1 TLB 300 for prefetch, in accordance with various embodiments. The L1 TLB 300 includes a first buffer line 305*a*, second buffer line 305*b*, third buffer line 305*c*, and fourth buffer line 305*d* (collectively, "buffer lines 305"), and a multiplexer 310. It should be noted that the various parts and components of the L1 TLB 300 are schematically illustrated in FIG. 3, and that modifications to the various components and other arrangements of the L1 TLB 300 may be possible and in accordance with the various embodiments.

In the example depicted, the L1 TLB 300 is a 4-line TLB, each line having 2JW of storage. Thus, each buffer line 305 may store 16 PTEs (e.g., 16 PTEs per line). As such, a 16:1 multiplexer 310 may be utilized to select a single PTE form a given buffer line 305*a*-305*d*. It is to be understood that in other examples, a different arrangement may be utilized in which a different number of PTEs may be stored in each line (e.g., 1JW lines storing 8 PTEs per line).

In various embodiments, the L1 TLB 300 may be utilized to convert a VA to a page table PA (e.g., an incoming client VA, or a VA to be prefetched and loaded into the double burst buffer or other prefetch FIFO). For example, logic (circled in dashed line) may be used to compute the PA of an L1 table pointer to fetch, in this example, a 2JW burst from DRAM to be loaded into a buffer line (e.g., first buffer line 305*a*) of the buffer lines 305 in the case of a miss. The L1 table pointer may be combined with the upper bits of the VA to generate a 35-bit physical address (e.g., Fetch[34:0]) from which data may be fetched from DRAM to be populated into the buffer lines 305. The L1 pointer may form bits Fetch[34:20] of the PA, Fetch[34:0].

Thus, to fetch 2JW of data to load a buffer line 305*a*-305*d* of the L1 TLB 300, 2JW alignment may be forced by the following operation:

$$L1\text{Fetch}[34:0]=L1\text{Pointer}[34:20]+VA[39:26].\text{`000000'} \quad (\text{Eq. 1})$$

where adders are denoted by '+' symbol, concatenation is denoted by the 'ω' symbol. In various examples, the data is fetched from the DRAM at the above calculated PA. Accordingly, the L1 TLB 300 may be configured to accept return data from DRAM at SCB rates to ensure the SCB is not stalled by the fetch operation.

In various examples, once the data is fetched from DRAM, it may be stored in the one or more buffer lines 305*a*-305*b*. Although depicted with four buffer lines, it is to be understood that in other embodiments, more or fewer buffer lines may be utilized.

In various examples, based on the VA, a line buffer 305*a*-305*d* may be selected utilizing a VA tag comparison, as previously described with respect to FIG. 2. For example, VA[39:26] bits may be utilized as a tag, and compared with VA tags associated with respective buffer lines 305*a*-305*d*. In the case of a hit (e.g., a match), the respective matching buffer line 305*a*-305*d* may be selected. The multiplexer 310 may be configured to select from the 16 PTEs of the respective buffer line 305*a*-305*d*, based on VA[26-22] bits, where each PTE may correspond to a respective L2 page table address.

In some examples, the selected L1 PTE may be 32-bits, PTE[31:0]. The L2 page table address may comprise bits PTE[22:0] of PTE[31:0]. As the L2 PTE bursts are 8JW in size, the L2 table pointer PA may aligned to 8JW, and generated as follows:

$$L2PA[34:0]=PTE[22:0].VA[21:18].\text{`00000000'} \quad (\text{Eq. 2})$$

Where the '00000000' is needed because L2 Table entries are 8JW. The addresses are computed 8× larger (e.g., 3 bits shifted) from the VA in order to fetch an 8JW burst. The above calculated L2 page table pointer PA may be sent to the SCB bus to be fetched (e.g., from DRAM and/or cache) and loaded into the prefetch FIFO. Accordingly, the L2 page table pointer PA is a PA within the L2 page table of the 8JW burst of L2 PTEs. More generically, a pointer PA may refer to a PA that points to another address or PTE (such as a PA within a page table).

In some further embodiments, the L1 TLB 300 may be configured to translate an L2 page table pointer PAs for one or more L2 TLBs. For example, in low data rate applications, the L1 may hold the entire VA space for all the L2 operations such that there are no L1 MISS conditions.

Figure 4:
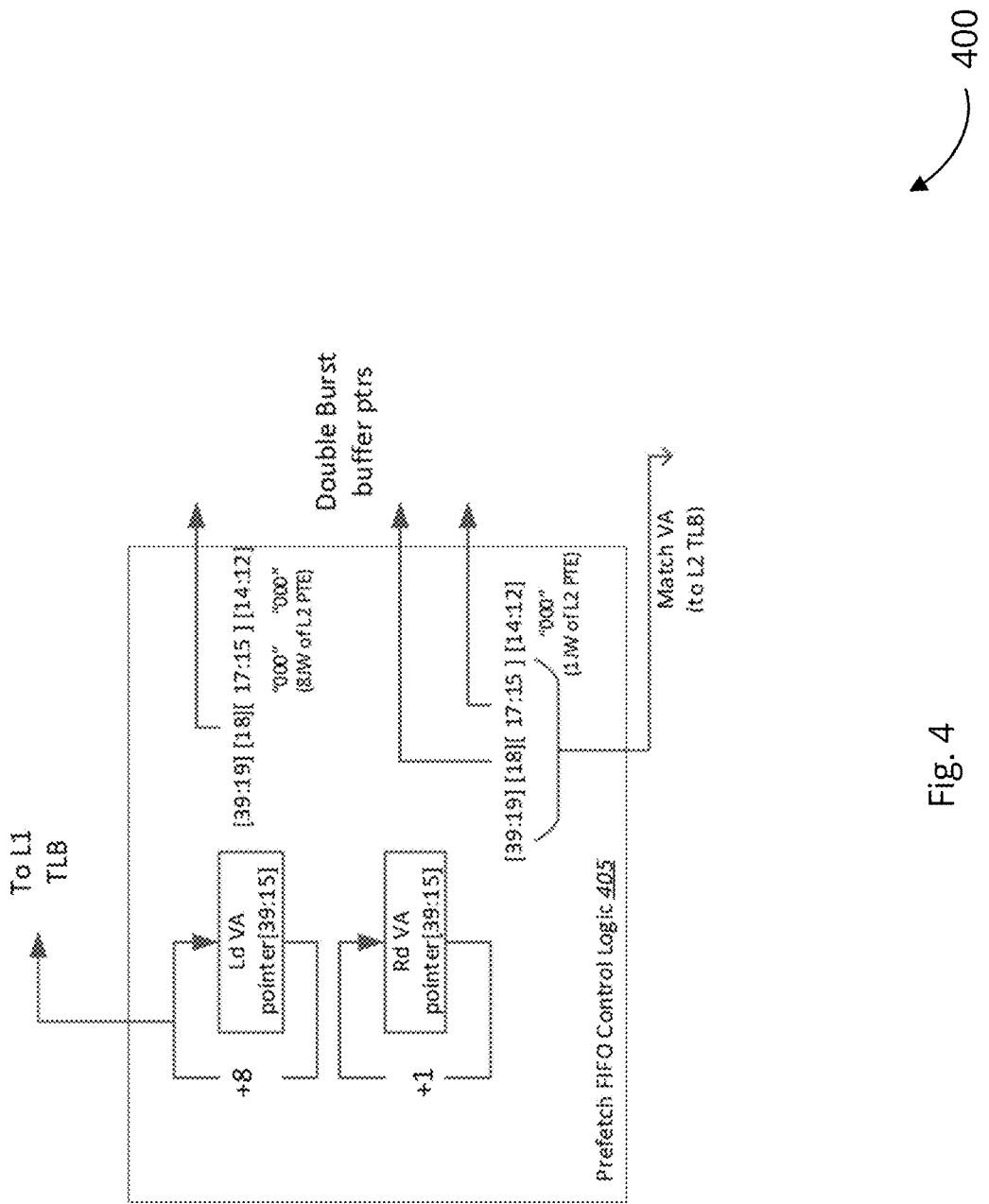
FIG. 4 is a schematic diagram of prefetch FIFO control logic, in accordance with various embodiments.

FIG. 4 is a schematic diagram of an architecture 400 for prefetch FIFO control logic 405, in accordance with various embodiments. In various embodiments, the prefetch FIFO control logic 405 may be configured to fill a prefetch FIFO, such as a double burst buffer, upon start of the core (e.g., a MMU physical and/or logical core). and to manage read/pop from the FIFO buffer to the L2 TLB.

In various examples, the Ld VA pointer may be configured to manage the loading of the prefetch FIFO buffer (e.g., a double burst buffer) whenever there is space available, such as on startup or in the event of an L1 MISS. It loads 8JW bursts at a time, and counts in VA space [39:15]. As previously described, on VA to PA translation, bits [17:15] serve as the VA of 8JW of L2 PTE data. In these examples, bits [17:15] are "000" as the bursts are always 8JW aligned. In some further embodiments, the Ld VA bit may determines whether the burst is loaded in the top or bottom of the double burst buffer.

In various embodiments, the Ld VA bits [39:15] may be sent to the L1 TLB when there is room to load the FIFO. As previously described with respect to FIG. 3, the L1 TLB may convert the VA to a PA, and send the burst to the SCB bus to fetch an 8JW chunk from an L2 page table (e.g., as may be stored in DRAM and/or in cache). In some examples, the Ld VA pointer is initialized by the same start address as a client VA, such that the prefetch is aligned to a specific client. In various examples, the Ld VA pointer may be incremented by +8 JW each time a burst is requested, based on the available space. In some embodiments, in the event of an L1 MISS condition (e.g., a PTE associated with the Ld VA pointer and/or a client address is not stored in the L1 TLB), the L1 TLB may be configured to obtain a new burst of PTEs (e.g., a 2JW burst of L1 PTEs).

In contrast, in various examples, the Rd VA increments by 1JW, and reads smaller L2 PTE 1JW data for the L2 TLB to utilize. In some embodiments, Rd VA bits [14:12] may be "000," corresponding to 8 PTEs within a single 1JW data read from the DRAM. Bits from Rd VA[17:15] may point to the location within the burst to the nearest 1JW for L2 TLB reads. Bit Rd VA[18] may determine whether to read the top or bottom half of the double burst buffer.

In various embodiments, the entire Rd VA [39:15] may be sent to the L2 TLB as the "match VA," to ensure that the incoming client VA is tagged against the Match VA (e.g., compared to the match VA tag, as previously described). In some embodiments, the Rd VA pointer may be initialized by the same start address as the client VA. In some examples, the Rd VA pointer may further increment by +1JW every time a pop is requested (if data is available in the FIFO). When the FIFO is empty, the Rd VA pointer does not increment.

In some alternative embodiments, the prefetch FIFO control logic may support other address schemes than the linear example above. For example, in some embodiments, a decrementing VA scheme may utilized (e.g., using subtracting VA pointers). In further embodiments, a circular buffer VA scheme may be utilized (e.g., when the VA pointers reaches a wrap-around, reload a new VA start point and proceed). In further embodiments, a stride VA scheme may be utilized (e.g., when the VA pointer reaches an end-of-stride, increment by the next-stride amount).

While some features and aspects have been described with respect to the embodiments, one skilled in the art will recognize that numerous modifications are possible. For example, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. An apparatus comprising:
   system memory;
   a memory management unit coupled to the system memory, the memory management unit comprising:
      a first translation lookaside buffer configured to fetch a first set of one or more first page table entries before a request to access data at a client address is received from a client, wherein the client address is an address in virtual memory space used by the client, and wherein the first set of one or more first page table entries is fetched based, at least in part, on a virtual address, wherein each first page table entry of the one or more first page table entries is associated with a respective page table address;
      a burst buffer configured to store a plurality of second page table entries from a respective page table associated with a first page table address;
      a second translation lookaside buffer configured to fetch a first set of one or more second page table entries of the plurality of second page table entries from the burst buffer based, at least in part, on the virtual address, and before the request to access data at the client address is received from the client; and
      control logic configured to transmit the virtual address to the first translation lookaside buffer and to the second translation lookaside buffer, and cause the burst buffer to store the plurality of second page table entries based, at least in part, on the virtual address.

2. The apparatus of claim 1, wherein the burst buffer is configured to store a burst of table entries, wherein the plurality of second page table entries comprises sixteen page table entries.

3. The apparatus of claim 1, wherein the first translation lookaside buffer is configured to translate the virtual address to a first pointer physical address of the system memory, wherein the first set of one or more first page table entries are fetched by the first translation lookaside buffer from the first pointer physical address.

4. The apparatus of claim 1, wherein the second translation lookaside buffer is configured to generate a virtual address tag based, at least in part, on the virtual address, and wherein the virtual address tag is associated with the first set of one or more second page table entries, wherein the second translation lookaside buffer is configured to receive the client address, and compare the virtual address tag with a first portion of the client address.

5. The apparatus of claim 4, wherein in response to determining that the virtual address tag and the first portion of the client address match, the second translation lookaside buffer is configured to select a respective second page table entry of the one or more second page table entries stored at the second translation lookaside buffer based, at least in part, on a second portion of the client address different from the first portion.

6. The apparatus of claim 5, further comprising address remapping logic configured to remap the client address to a physical address of the system memory based, at least in part, on the respective second page table entry selected by the second translation lookaside buffer.

7. The apparatus of claim 5, wherein in response to determining that the virtual address tag and the first portion of the client address do not match, the second translation lookaside buffer is configured to fetch a second set of one or more second page table entries from the burst buffer, wherein the second set of one or more second page table entries is different from the first.

8. The apparatus of claim 7, wherein in response to determining that the virtual address tag and the first portion of the client address do not match, the control logic is further configured to determine whether the first set of one or more first page table entries stored in the first translation lookaside buffer is associated with the client address.

9. The apparatus of claim 8, wherein in response to determining that none of the first set of one or more first page table entries are associated with the client address, the first translation lookaside buffer is further configured to generate a second pointer physical address of the system memory based, at least in part, on the client address, and fetch a second set of one or more first page table entries based on the second pointer physical address.

10. A memory management unit comprising:
a first translation lookaside buffer configured to prefetch a first set of one or more first page table entries based, at least in part, on a virtual address, wherein each first page table entry of the one or more first page table entries is associated with a respective page table address, and wherein the prefetch of the first set of one or more first page table entries occurs before a request to access data at a client address is received from a client, wherein the client address is an address in virtual memory space used by the client;
a burst buffer configured to store a plurality of second page table entries from a respective page table associated with a first page table address;
a second translation lookaside buffer configured to prefetch a first set of one or more second page table entries of the plurality of second page table entries from the burst buffer based, at least in part, on the virtual address, wherein the prefetch of the first set of one or more second page table entries occurs before a request to access data at a client address is received from the client; and
control logic configured to transmit the virtual address to the first translation lookaside buffer and to the second translation lookaside buffer, and cause the burst buffer to store the plurality of second page table entries based, at least in part, on the virtual address.

11. The memory management unit of claim 10, wherein the first translation lookaside buffer is configured to translate the virtual address to a first pointer physical address of the system memory, wherein the first set of one or more first page table entries are fetched by the first translation lookaside buffer from the first pointer physical address.

12. The memory management unit of claim 10, wherein the second translation lookaside buffer is configured to generate a virtual address tag based, at least in part, on the virtual address, and wherein the virtual address tag is associated with the first set of one or more second page table entries, wherein the second translation lookaside buffer is configured to receive the client address, and compare the virtual address tag with a first portion of the client address.

13. The memory management unit of claim 12, wherein in response to determining that the virtual address tag and the first portion of the client address match, the second translation lookaside buffer is configured to select a respective second page table entry of the one or more second page table entries stored at the second translation lookaside buffer based, at least in part, on a second portion of the client address different from the first portion.

14. The memory management unit of claim 12, wherein in response to determining that the virtual address tag and the first portion of the client address do not match, the second translation lookaside buffer is configured to fetch a second set of one or more second page table entries from the burst buffer, wherein the second set of one or more second page table entries is different from the first.

15. The memory management unit of claim 12, wherein in response to determining that the virtual address tag and the first portion of the client address do not match, the control logic is further configured to determine whether the first set of one or more first page table entries stored in the first translation lookaside buffer is associated with the client address, and in response to determining that none of the first set of one or more first page table entries are associated with the client address, the first transaction lookaside buffer is further configured to generate a second pointer physical address of the system memory based, at least in part, on the client address, and fetch a second set of one or more first page table entries based on the second pointer physical address.

16. A system comprising:
system memory;
a processor coupled to the system memory;
a non-transitory computer readable storage having encoded thereon a set of instructions executable by the processor to:
transmit a virtual address to a first translation lookaside buffer and to a second translation lookaside buffer;
fetch a first set of one or more first page table entries before a request to access data at a client address is received from a client, wherein the client address is an address in virtual memory space used by the client, and wherein the first set of one or more first page table entries is fetched based, at least in part, on the virtual address, wherein each first page table entry of the one or more first page table entries is associated with a respective page table address;
store, via the first translation lookaside buffer, the first set of one or more first page table entries;
store, via a burst buffer, a plurality of second page table entries based, at least in part, on the virtual address;
fetch, via the second translation lookaside buffer, a first set of one or more second page table entries of the plurality of second page table entries from the burst buffer based, at least in part, on the virtual address, and before the request to access data at the client address is received from the client; and
store, via the second translation lookaside buffer, the first set of one or more second page table entries.

17. The system of claim 16, wherein the set of instructions is further executable by the processor to:
translate, via the first translation lookaside buffer, the virtual address to a first pointer physical address of the system memory, wherein the first set of one or more first page table entries are fetched by the first translation lookaside buffer from the first pointer physical address of the system memory.

18. The system of claim 17, wherein the set of instructions is further executable by the processor to:
- generate a virtual address tag based, at least in part, on the virtual address, and wherein the virtual address tag is associated with the first set of one or more second page table entries;
- receive the client address from the client; and
- compare, via the second translation lookaside buffer, the virtual address tag with a first portion of the client address.

19. The system of claim 17, wherein the set of instructions is further executable by the processor to:
- select, via the second translation lookaside buffer and in response to determining that a virtual address tag and a first portion of the client address match, a respective second page table entry of the one or more second page table entries stored at the second translation lookaside buffer based, at least in part, on a second portion of the client address different from the first portion.

20. The system of claim 19, wherein the set of instructions is further executable by the processor to:
- fetch, via the second translation lookaside buffer, a second set of one or more second page table entries from the burst buffer in response to determining that the virtual address tag and the first portion of the client address do not match, wherein the second set of one or more second page table entries is different from the first.

* * * * *